UNITED STATES PATENT OFFICE.

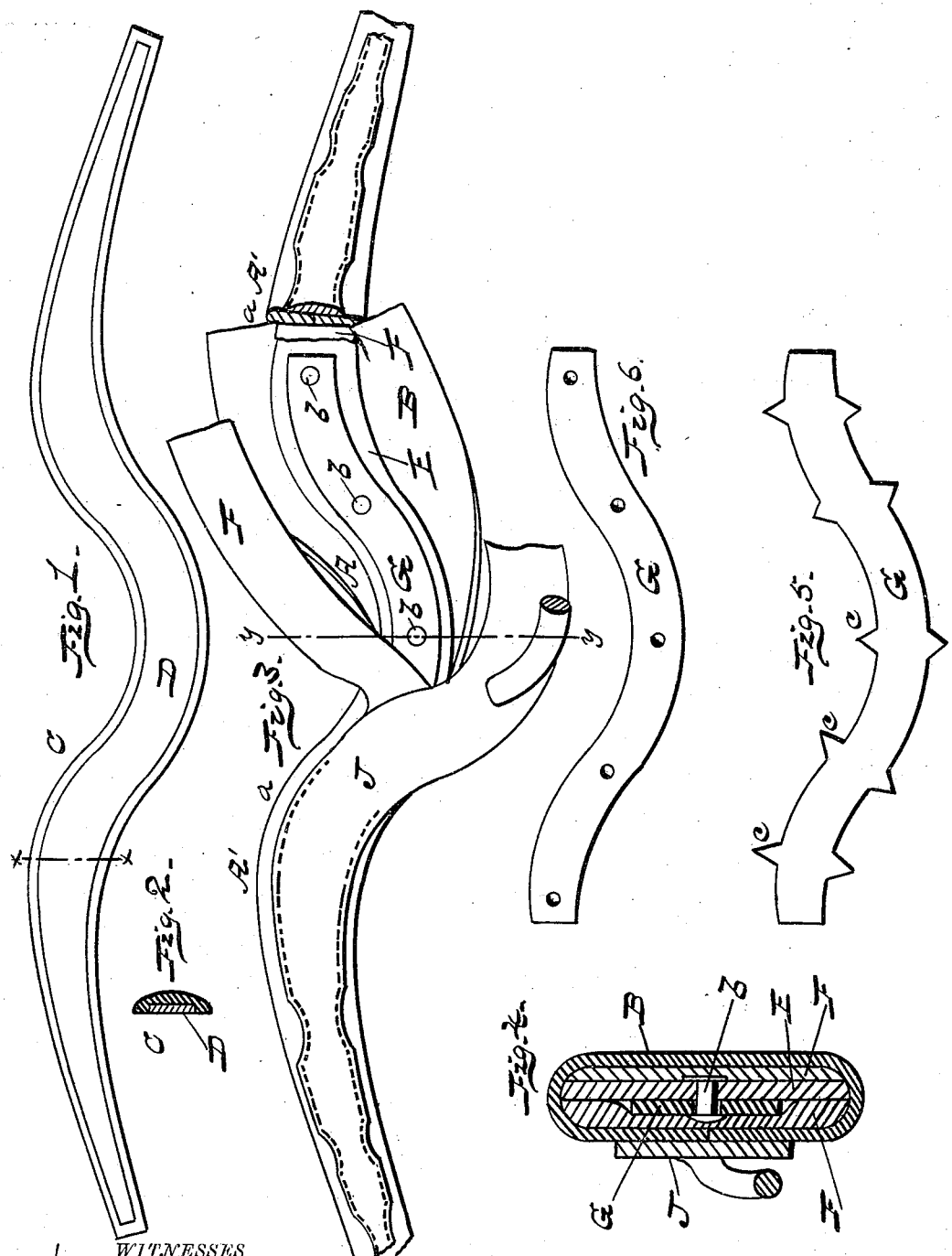

I. AMOS MILLER, OF WESTMINSTER, MARYLAND.

HARNESS BREAST-STRAP.

SPECIFICATION forming part of Letters Patent No. 334,128, dated January 12, 1886.

Application filed November 11, 1885. Serial No. 182,427. (No model.)

*To all whom it may concern:*

Be it known that I, I. AMOS MILLER, a citizen of the United States, residing at Westminster, in the county of Carroll and State of Maryland, have invented certain new and useful Improvements in Harness Breast-Straps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a view of the "former" or crimp on which the covering of my collar is molded. Fig. 2 is a cross-section through the same at the dotted line $x\ x$. Fig. 3 is a front view of a "breast-strap" or collar, parts of which are cut away to expose my improvement. Fig. 4 is an enlarged cross-section through Fig. 3, taken in the dotted line $y\ y$. Fig. 5 is a modification in detail, showing fastening-spurs on plate G. Fig. 6 is a face view of the perforated plate.

This invention relates to that part of the harness for a horse which is known as the "breast-collar;" and it relates especially to collars which are constructed with a vertical arch or curve at and near the middle of their length for the purpose of relieving undue pressure on the wind-pipe and jugular vein of the animal. Previous to my invention it has been attempted to relieve said vital parts of a horse from injurious pressure by employing a rigid metallic arch, horizontally arranged, and having hinged to its ends two metallic straps, which were secured to the filling-leather of the collar. The said arch, owing to its position on the collar, necessarily presented a protuberance which was not only unsightly, but otherwise very ojectionable. Other means—such, for instance, as wire stiffeners and a filling of enameled leather—have been essayed for the purpose I have in view, but have failed to meet the requirements of the case.

The object of my invention is to maintain the vertical arch of a breast-collar intact and at the same time to provide for allowing the arch of the collar all the horizontal flexibility required to adapt itself comfortably to the breast of the horse; also to provide for positively and durably securing the flexible and elastic plate to the leather filling of the collar. The manner of attaining these objects will be fully understood from the following description when taken in connection with the annexed drawings.

A designates the vertical arch or bow of the breast-collar, which crosses the wind-pipe or trachea of the horse, and A' A' the extensions which lie upon the shoulders of the animal and to which the traces are attached in the usual manner. The span of the arch A is such that there will be comparatively little pressure upon the wind-pipe and blood-vessels of the neck, most of the draft and pressure falling upon the horse's shoulders from the points $a\ a$ outward and backward. The cover B of a collar of this shape is molded by stretching it while in a proper moist condition upon a former or tree, C. (Shown by Figs. 1 and 2.) This tree C is preferably made of metal, and in a groove on one side of which a piece, D, of soft lead, or other suitable soft metal, is properly embedded for the purpose of receiving the points of tacks that are used temporarily for holding the cover B properly stretched on the tree until dry and set.

One of the objects of my invention is to maintain intact the shape thus given to the cover; or, in other words, to prevent the arch A from unduly elongating when the collar is on the horse and under strain. This I accomplish as follows: E designates a thick leather core or filling, and F F the cloth strips or padding which are stitched to the front and back sides of the filling-strip E, all of which have the same curved shape as the covering B, in which they are enveloped when the collar is finished.

G designates a broad flat plate of sheet-brass or other suitable metal, which is sufficiently thin to allow all the elasticity and adaptability required to the breast of the horse. This plate G may be of any desired width less than the width of the leather filling or core E, and it is arched corresponding to the general contour of the arch A of the collar, the object being to resist the tendency of the draft on the collar to straighten out said arch and cause this part of the collar to unduly press on the wind-pipe of the animal. This arched plate G is applied to the front of the filling E, and covered by the front cloth piece, F, as shown in Fig. 4.

To positively retain the plate G in its proper place inside of the collar, I prefer to secure it to the filling E by means of metal rivets b b b, passed through it and the filling and clinched, as shown in Fig. 4.

Instead of the rivets b, or in combination therewith, I may form burrs or points e on the edges of the plate G, and after inserting them through the filling clinching their ends, as shown by Fig. 5.

After the filling with the plate G are inclosed by the cover B, and the edges of the latter temporarily sewed together, the seam is covered by the facing-strip J, and the whole stitched together.

It will be observed that the vertically-arched plate G is firmly secured in its place inside of the cover B by metallic fastenings, which will neither yield to strain nor decay; that this flat plate G will preserve the arched shape of the bow A, and at the same time afford the required flexibility to allow the collar to adjust itself to the horse and to prevent undue pressure upon the wind-pipe and jugular veins; also, that the collar will fit better about the shoulders of the horse, avoiding sliding movements and galling of the parts against which it presses.

Having described my invention, what I claim as new is—

1. The combination, with a breast-collar having the vertical arch A and filling or core E, as shown, of the flat elastic arched plate G and the metal fastenings therefor, the same constituting an improved article of manufacture.

2. The improved article of manufacture described, consisting of the flat elastic metal breast-collar plate, arched and perforated in the manner and for the purposes described.

In testimony whereof I affix my signature in presence of two witnesses.

I. AMOS MILLER.

Witnesses:
J. W. HENNY,
HUGO E. FIDDIS.